United States Patent [19]

Campbell

[11] Patent Number: 4,891,508
[45] Date of Patent: Jan. 2, 1990

[54] PRECISION INFRARED POSITION DETECTOR APPARATUS FOR TOUCH SCREEN SYSTEM

[75] Inventor: John W. Campbell, Monument, Colo.

[73] Assignee: Hewlett-Packard Company, Palo Alto, Calif.

[21] Appl. No.: 213,405

[22] Filed: Jun. 30, 1988

[51] Int. Cl.[4] .............................................. G01V 9/04
[52] U.S. Cl. ..................................... 250/221; 340/712
[58] Field of Search ................. 250/221; 340/706, 708, 340/709, 712, 555, 556; 341/31; 178/18

[56] References Cited

U.S. PATENT DOCUMENTS

| | | | |
|---|---|---|---|
| 4,437,632 | 4/1988 | Kawabe et al. | 250/221 |
| 4,737,631 | 4/1988 | Sasaki et al. | 250/221 |
| 4,751,379 | 6/1988 | Sasaki et al. | 340/556 |
| 4,764,885 | 8/1988 | Greanias et al. | 340/708 |
| 4,766,424 | 8/1988 | Adler et al. | 250/221 |
| 4,812,830 | 3/1989 | Doering | 250/221 |

*Primary Examiner*—David C. Nelms
*Attorney, Agent, or Firm*—Karl E. Bring

[57] ABSTRACT

The precision infrared position detector apparatus uses an information display device that has a substantially cylindrical shaped screen to limit curvature of the screen to a single dimension. In addition, to compensate for this curvature, a flexible printed circuit board is used to align the row of infrared light sources and detectors along the same curvature as the screen of the information display device. A first flexible printed circuit board is equipped with a single row of infrared light sources while a second flexible printed circuit board is equipped with a signal row of corresponding infrared light detectors. A frame member is used to bend the flexible printed circuit board into a substantially cylindrical shape that matches the curvature of the screen of the information display device. In this manner, the first and second flexible printed circuit boards are placed at opposite ends of the rectangular shaped screen of the information display device to thereby transmit a plurality of parallel beams of infrared light, each of which is a predetermined distance above the screen of the information display device even though the screen of the information display device curves in the shape of a cylinder.

14 Claims, 3 Drawing Sheets

PRECISION INFRARED POSITION DETECTOR APPARATUS FOR TOUCH SCREEN SYSTEM

FIELD OF THE INVENTION

This invention relates to touch screen systems and, in particular, to a precision infrared detector apparatus that precisely identifies the location of a user activated stylus that is used to select indicia displayed on the screen of an information display device.

PROBLEM

It is a problem in the field of touch screen systems to accurately identify the location of the user activated stylus to select indicia that are displayed on the screen of an information display device. Touch screen systems typically make use of a rectangular shaped array of infrared light sources and detectors to identify the position of the stylus. The infrared light sources are arranged in a row along two sides of the rectangle while the remaining two sides of the rectangle are equipped with corresponding infrared light detectors. The infrared light sources and light detectors are arranged in a flat plane so that a matrix of parallel, equally spaced beams of infrared light crisscross the rectangular area in front of the screen of the information display device. This produces an xy coordinate system of infrared light beams that can be used to identify the location of a user activated stylus. As the user touches the screen of the information display device with the tip of the stylus, the stylus interrupts an infrared light beam in both the x and the y coordinate directions. Scanning circuitry is provided to periodically poll each of the infrared detectors to thereby identify which of the x and y coordinate infrared light beams was interrupted by the user activated stylus. The identity of the interrupted light beams as determined through scanning the infrared detectors provides a fairly precise identification of the location of the user activated stylus.

A significant difficulty with this arrangement is that the screen of the information display device is typically in the shape of a sphere. Thus, the rectangular array of infrared light sources and detectors produces a set of xy coordinate infrared light beams, which infrared light beams vary in distance from the screen of the information display device. Thus, the distance between the infrared light beams and the screen increases as a function of the distance from the center of the screen. Therefore, in the area around the center of the screen of the information display device, the x and y coordinate beams of infrared light are fairly close to the screen of the information display device and accurately identify the position of the tip of the stylus with respect to indicia that appears on the screen of the information display device. As the distance from the center of the screen increases, the distance between the x and y coordinate infrared light beams and the screen of the information display device increases. This variable distance introduces a certain amount of error since the x and y coordinate infrared light beams detect the position of the tip of the stylus as it comes in the vicinity of the screen of the information display device not as it touches the screen of the information display device. The tip of the stylus as it passes through x and y coordinate infrared light beams can be angularly displaced so that the point on the screen of the information display device that is signified by the point of the stylus does not match the x and y coordinate point detected by the interruption of the x and y coordinate infrared light beams. The spacing of the indicia on the screen of the information display device must therefore be far enough apart to account for any inaccuracies caused by the distance between the infrared light beams and the screen of the information display device. This limits the density of the indicia that can be displayed on the information display device.

SOLUTION

The above described problems are solved and a technical advance achieved in the field by the precision infrared position detector apparatus of this invention. The precision infrared position detector apparatus uses an information display device that has a cylindrical shaped screen to limit curvature of the screen to a single dimension. In addition, to compensate for this curvature, a flexible printed circuit board is used to align the row of infrared light sources and detectors along the same curvature as the screen of the information display device. A first flexible printed circuit board is equipped with a single row of infrared light sources while a second flexible printed circuit board is equipped with a single row of corresponding infrared light detectors. A frame member is used to bend the flexible printed circuit board into a substantially cylindrical shape that matches the curvature of the screen of the information display device. In this manner, the first and second flexible printed circuit boards are placed at opposite ends of the rectangular shaped screen of the information display device to thereby transmit a plurality of parallel beams of infrared light, each of which is a predetermined distance above the screen of the information display device even though the screen of the information display device curves substantially in the shape of a cylinder. This minimizes the inaccuracies found in prior touch screen systems by providing a set of infrared light beams in one dimension that are a precise distance above the screen of the information display device. The interruption of infrared light beams in both the x and y coordinate directions is necessary to select an indicia that appears on the screen of the information display device. Therefore, the touch sensitivity relative to the screen of the information display device is determined by the curved set of infrared light beams.

DETAILED DESCRIPTION OF THE DRAWING

It is a problem in the field of touch screen systems to accurately identify the location of the user activated stylus to select indicia that are displayed on the screen of an information display device. Touch screen systems typically make use of a rectangular shaped array of infrared light sources and detectors to identify the position of the stylus. The infrared light sources are arranged in a row along two sides of the rectangle while the remaining two sides of the rectangle are equipped with corresponding infrared light detectors. The infrared light sources and light detectors are arranged in a flat plane so that a matrix of parallel equally spaced beams of infrared light crisscross the rectangular area in front of the screen of the information display device. This produces an xy coordinate system of infrared light beams that can be used to identify the location of a user activated stylus. As the user touches the screen of the information display device with the tip of the stylus, the stylus interrupts an infrared light beam in both the x and the y coordinate directions. Scanning circuitry is provided to periodically poll each of the infrared detectors to thereby identify which of the x and y coordinate infrared light beams was interrupted by the user activated stylus. The identity of the interrupted light beams as determined through scanning the infrared detectors provides a fairly precise identification of the location of the user activated stylus.

Figure 2:
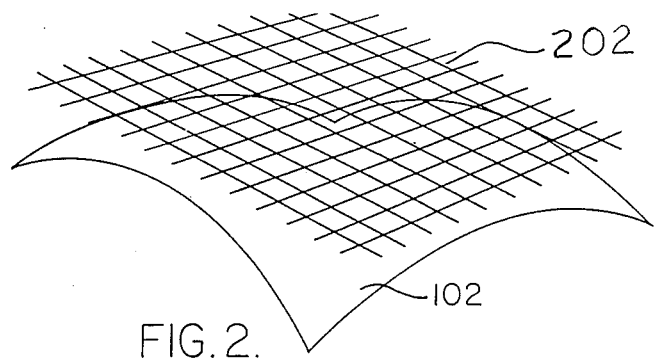
FIG. 2 illustrates an end view of the screen of the information display device and the matrix of infrared light beams.

A significant difficulty with this arrangement is that the screen of the information display device is typically in the shape of a sphere (FIG. 2). Thus, the rectangular array of infrared light sources and detectors produces a set of xy coordinate infrared light beams 202, which infrared light beams vary in distance from the screen 102 of the information display device 101. Thus, the distance between the infrared light beams 202 and the screen 102 increases as a function of the distance from the center of the screen 102. Therefore, in the area around the center of the screen of the information display device, the x and y coordinate beams of infrared light are fairly close to the screen of the information display device and accurately identify the position of the tip of the stylus with respect to indicia that appears on the screen of the information display device. As the distance from the center of the screen increases, the distance between the x and y coordinate infrared light beams and the screen of the information display device increases. This variable distance introduces a certain amount of error since the x and y coordinate infrared light beams detect the position of the tip of the stylus as it comes in the vicinity of the screen of the information display device not as it touches the screen of the information display device. The tip of the stylus as it passes through x and y coordinate infrared light beams can be angularly displaced so that the point on the screen of the information display device that is signified by the point of the stylus does not match the x and y coordinate point detected by the interruption of the x and y coordinate infrared light beams. The spacing of the indicia on the screen of the information display device must therefore be far enough apart to account for any inaccuracies caused by the distance between the infrared light beams and the screen of the information display device. This limits the density of the indicia that can be displayed on the information display device.

The precision infrared detector apparatus uses an information display device that has a substantially cylindrical shaped screen to limit curvature of the screen to a single dimension. In addition, to compensate for this curvature a flexible printed circuit board is used to align the row of infrared light sources and detectors along the same curvature as the screen of the information display device. A first flexible printed circuit board is equipped with a single row of infrared light sources while a second flexible printed circuit board is equipped with a single row of corresponding infrared light detectors. A frame member is used to bend the flexible printed circuit board into a substantially cylindrical shape that matches the curvature of the screen of the information display device. In this manner, the first and second flexible printed circuit boards are placed at opposite ends of the rectangular shaped screen of the information display device to thereby transmit a plurality of parallel beams of infrared light, each of which is a predetermined distance above the screen of the information display device even though the screen of the information display device curves in the shape of a cylinder. This minimizes the inaccuracies found in prior touch screen systems by providing a set of infrared light beams in one dimension that are a precise distance above the screen of the information display device. Therefore, the touch sensitivity relative to the screen of the information display device is determined by the curved set of infrared light beams.

System Architecture

Figure 1:
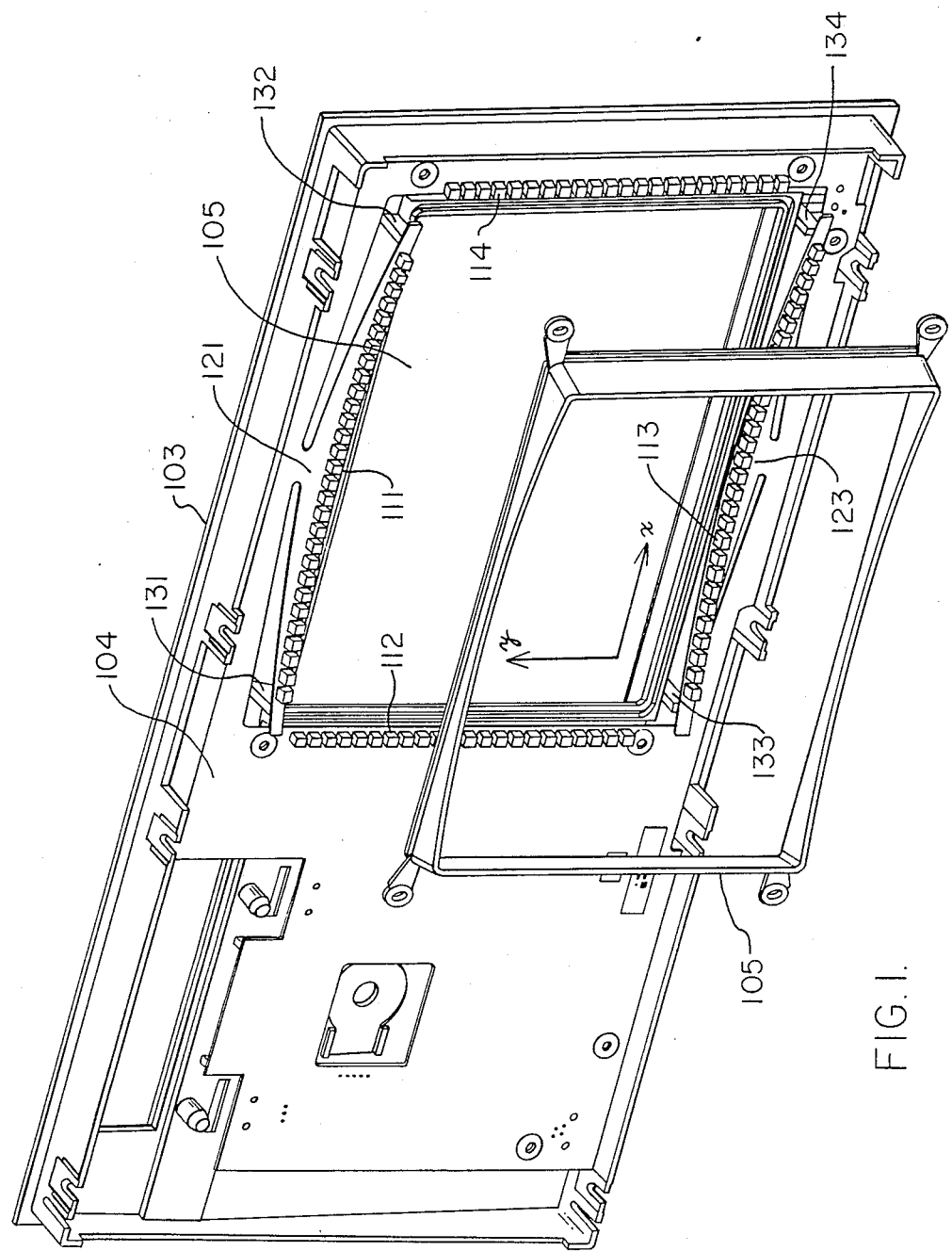
FIG. 1 illustrates a perspective view of the precision infrared position detector apparatus.

FIG. 1 illustrates in perspective view the precision infrared position detection apparatus of this invention. This apparatus is part of a touch screen control system, the remainder of which is not shown in this figure. The touch screen system typically includes a control processor that generates various displays, such as that illustrated in FIG. 6, which contain information for the user and indicia that are user selectable. The touch screen system functions to provide the user with a self explanatory display that enables the user to identify a desired system response such as the provision of more information or the performance of a selected operation. The user selects the desired system response by touching a corresponding indicia element displayed on the screen on the touch screen system with a user activated stylus. The operation of the user touching the screen of the touch screen system with a stylus is detected by the use of the precision infrared position detection apparatus of this invention. This apparatus includes an information display device 101 which consists of a cathode ray tube of the type manufactured by Sony Corporation, under the brand name Trinatron. Information display device 101 includes a screen 102 on which the control processor (not shown) of the touch screen system presents the above mentioned displays. The screen 102 of information display device 101 has a shape that is substantially cylindrical in nature. That is, the screen 102 of information display device 101 is approximately defined by a segment of the surface of a cylinder of a predetermined radius. The Trinatron cathode ray tube has radii of 415 mm and 9000 mm in the x and y coordinate axis directions respectively. FIG. 1 illustrates x and y coordinate axes by the two arrows labeled x and y respectively. In the x axis direction, screen 102 is a curved surface of fixed radius. In the y coordinate direction, screen 102 of information display device 101 has little to no curvature. In the example of this embodiment, the radius of the screen in the y coordinate axis is 9000 mm which produces almost no curvature in the y axis direction.

Screen Display

Figure 6:
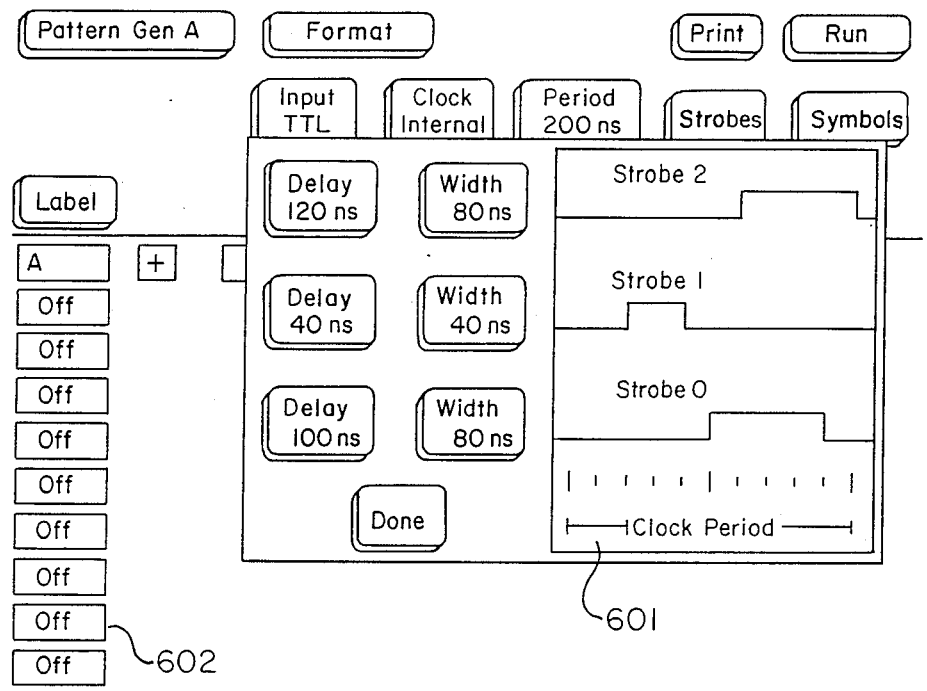
FIG. 6 illustrates a typical screen display used on the touch screen system.

A typical touch system screen display illustrated in FIG. 6. This screen display includes one or more information fields 601 which provide the user with information concerning the operation of the system. One or more indicia fields 602 are also provided to enable the user to select a desired system response. In the screen display illustrated in FIG. 6, it is apparent that the vertical column of indicia fields 602 on the left side of the drawing are particularly susceptible to the misalignment of the user-activated stylus, since they are at the extreme edge of screen 102 of information display device 101.

Infrared Light Source and Detector Array

In order to accurately detect the position of a user activated stylus with respect to an indicia that appears on screen 102 of information display device 101, an array of infrared light source and detector elements 111-114 are provided. The infrared light source and detector elements 111-114 are arranged in a rectangular shaped array to provide a matrix of crossing infrared light beams in the shape of a rectangular xy coordinate axis system. A plurality of parallel, equally spaced infrared light beams are generated in the x coordinate direction while a plurality of parallel, equally spaced infrared light beams are also produced in the y coordinate direction. These infrared light beams in the x and y coordinate directions are perpendicular to each other so that a grid is formed of equally spaced infrared light beams to provide an indication of the position of the user activated stylus when the stylus is used to touch an indicia on screen 102 of information display device 101. A scanner monitors the output of the infrared light detectors to identify when one of the infrared detectors does not receive the corresponding infrared light beam generated by an associated infrared light source due to the presence of the user activated stylus interrupting the transmission of the infrared light beam.

The rectangular array of infrared light source and detector elements 111-114 consists of a row of infrared light sources 111, 112 such as light emitting diodes placed along first and second sides of the screen 102 of information display device 101. A corresponding matching set of infrared light detectors 113, 114 are placed along third and fourth sides of screen 102 of information display device 101 on opposite sides of the rectangular array from the corresponding set of infrared light sources 111, 112 respectively. Thus, each infrared light source in the array has a corresponding infrared light detector which is placed on the opposite side of the rectangular shaped array. In this fashion, the rectangular array generates x and y coordinate infrared light beams in a plane parallel to and a predetermined distance above screen 102 of information display device 101.

Angular Displacement of the Stylus

Figure 5:
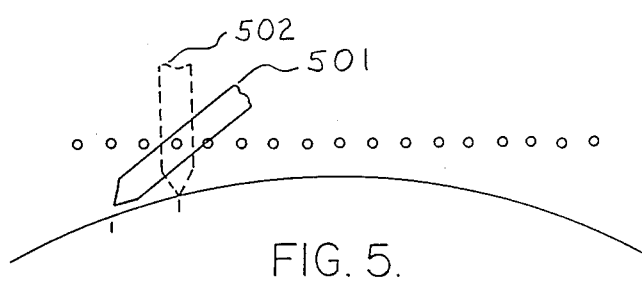
FIG. 5 illustrates an end view of the screen of the information display device and the matrix of infrared light beams, showing an angularly displaced stylus.

The difficulty with the use of a rectangular array that forms a flat plane is that screen 102 of information display device 101 is a curved surface so that at the extreme ends of the x coordinate direction, the distance between the infrared light beams and screen 102 of information display device 101 significantly differs from the distance between the infrared light beams and screen 102 of information display device 101 in the center of screen 102. Thus, the further out to the extremities in the x coordinate direction of screen 102 of information display device 101 that indicia are displayed, the more likely there is an opportunity for the occurrence of an error due to the stylus being angularly oriented with respect to screen 102 of information display device 101. Thus, if the stylus is not precisely aligned perpendicular to screen 102 of information display device 101, an incorrect reading can be obtained as to the ones of indicia displayed on screen 102 of information display device 101. This is illustrated schematically in FIG. 5 where the solid line representation of the stylus 501 indicates the true position and orientation of the stylus with respect to screen 102 of information display device 101. The dotted line representation of the stylus 502 indicates the position of the stylus that is signified to the touch screen system by the interruption of the infrared light beams as shown on FIG. 5. It is evident that the spacing of the indicia on screen 102 of information display device 101 must be selected so that accurate indicia selection determinations are obtained for a range of angular misorientations of the stylus. This limits the density of indicia that can be used on a display.

In order to increase the density of indicia that can be displayed on screen 102 on information display device 101, the accuracy of the infrared position detection apparatus must be improved. This is accomplished by the precision infrared position detection apparatus of this invention which compensates for the curvature in screen 102 of information display device 101. This apparatus generates a plurality of parallel, equally spaced infrared light beams in the y coordinate direction, each of which is a predetermined distance above screen 102 of information display device 101. The positioning of the infrared light beams close to screen 102 of information display device 101 in the y coordinate direction thereby provides a more precise indication of the x coordinate location of the user activated stylus in the selection of an indicia on the screen 102 of information display device 101. The interruption of infrared light beams in both the x and y coordinate directions is necessary to select an indicia that appears on the screen of the information display device. Therefore, the touch sensitivity relative to the screen of the information display device is determined by the curved set of infrared light beams.

Flexible Printed Circuit Board

The curved arrangement of the infrared light sources 111 and the corresponding infrared light detectors 113 is obtained by the use of a printed circuit board 104. This printed circuit board 104 in the preferred embodiment is a single unit that contains various control electronics along with the infrared light sources 111, 112 and infrared light detectors 113, 114. An aperture 105 is provided in printed circuit board 104, which aperture 105 is the size and shape to match screen 102 of information display device 101. Printed circuit board 104 is shown as a single unit, although it is obvious that it can be implemented by the use of a plurality of individual elements, which option is a matter of engineering choice.

Figure 3:
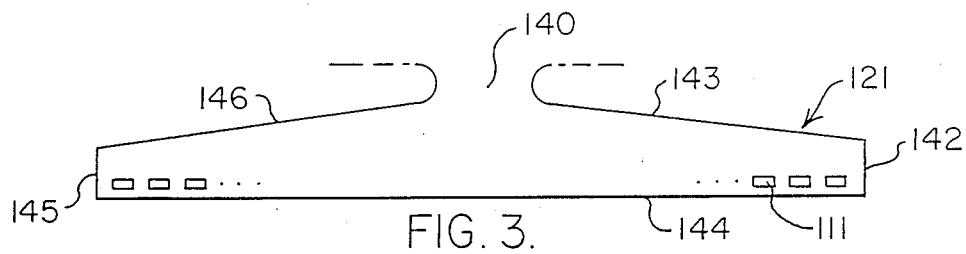
FIGS. 3 and 4 illustrate additional detailed views of the precision infrared position detector apparatus.

Printed circuit board 104 contains two flexible segments 121, 123 which are equipped with infrared light sources 111 and infrared light detectors 113, respectively. FIG. 3 illustrates additional detail of flexible segment 121. The infrared light sources 111 are arranged in a straight line along the edge 144 of the flexible segment 121 of printed circuit board 104. Similarly, infrared light detectors 113 are arranged in a straight line along the edge of flexible segment 123 of printed circuit board 104. Infrared light sources 111 and infrared light detectors 113 are placed on opposite sides of aperture 105 in a parallel, mating orientation so each one of infrared light sources 111 has a corresponding infrared light detector 113 on the opposite side of aperture 105. In this fashion, each of the plurality of infrared light sources 111 transmits an infrared light beam across aperture 105 to the associated infrared light detector.

The plurality of infrared light sources 111 produces a like plurality of infrared light beams which infrared light beams are parallel to each other to form a grid pattern, as discussed above.

Frame

FIG. 3 illustrates additional detail of flexible segment 121 of printed circuit board 104. A portion 140 of flexible segment 121 is secured to the remainder of printed circuit board 104. This portion 140 is located in the middle along the long dimension of flexible segment 121. The remainder of flexible segment 121 is in the shape of two truncated triangles, having a straight side 144 and an angled side 143, 146, with the narrow ends 142, 145 distant from the midsection portion 140 of flexible segment 121. A triangular shape is selected for flexible segment 121 in order to bend along a radius to obtain the cylindrical or substantially cylindrical shape rather than a parabolic shape. This shape reduces the moment of force on the midsection portion 140 of flexible segment 121 where it attaches to the remainder of printed circuit board 104. The straight side 144 of flexible segment 121 faces in to aperture 105 and it is along straight side 144 that the plurality of infrared light sources 111 are attached in a row.

Figure 4:
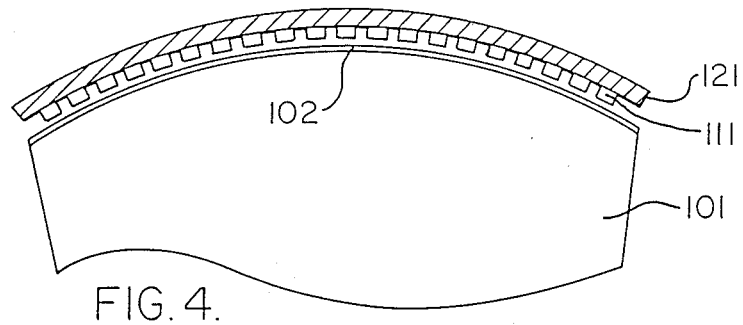

In order to obtain the proper curvature for flexible section 121, 123 of printed circuit board 104, frame 103 is provided with a number of spacers 131–134. The shape and size of flexible segments 121, 123 of printed circuit board 104 is such that each one of the flexible segments 121, 123 of printed circuit board 104 is secured midway along its length to the remainder of printed circuit board 104 while the distal ends thereof are not connected to the remainder of printed circuit board 104 and are free to be moved in a direction that is perpendicular to screen 102 of information display device 101. Thus, the two ends of flexible segment 121 of printed circuit board 104 can be translated to be placed in juxtaposed position with screen 102 of information display device 101 (FIG. 4). Frame 103 is equipped with a plurality of spacers (for example 131, 132) which are positioned opposite the ends of flexible segment 121 of printed circuit board 104. When frame 103 is secured to the housing 105 that is provided for information display device 101, spacers 131, 132 come into contact with the ends of flexible segment 121 of printed circuit board 104, causing flexible segment 121 of printed circuit board 104 to translate into proximate relation with screen 102 of information display device 101. Thus, spacers 131, 132 curve flexible segment 121 of printed circuit board 104 into the same curvature as screen 102 of information display device 101 so that the line of infrared light sources 111 attached to flexible segment 121 of printed circuit board 104 are coextensive with and juxtaposed to screen 102 of information display device 101.

While a specific embodiment of the invention has been disclosed, it is expected that those skilled in the art can and will devise alternate embodiments that fall within the scope of the appended claims.

I claim:

1. Infrared touch control apparatus for accurately registering the position of a user activated stylus comprising:

means for displaying a plurality of indicia, wherein said display means has a screen that is substantially in the shape of a segment of a cylinder, including first and second spaced apart parallel curved sides and third and fourth spaced apart parallel straight sides, such that said first, second, third, fourth sides form a substantially rectangular shaped screen;

a plurality of infrared light source means disposed in a row along with first side of said screen of said displaying means for emitting a plurality of parallel infrared light beams along said screen of said displaying means a predetermined distance above said screen of said displaying means;

flexible printed circuit board means connected to said plurality of infrared light source means for positioning said plurality of infrared light source means to conform to the curvature of said screen of said displaying means such that each of said plurality of infrared light source means is a predetermined distance above said screen of said displaying means;

a like plurality of infrared light detector means disposed in a row along said second side of said screen of said displaying means in spaced apart parallel mating relationship to said plurality of infrared light source means, each of said infrared light detector means for receiving a corresponding one of said parallel infrared light beams; and flexible printed circuit board means connected to said plurality of infrared light detector means for positioning said plurality of infrared light detector means along said screen of said displaying means a predetermined distance above said screen of said displaying means.

2. The apparatus of claim 1 further including:

frame means for securing said flexible printed circuit board means in position in proximate relationship with said screen of said displaying means.

3. The apparatus of claim 2 wherein said frame means includes:

means for securing said flexible printed circuit board midway along its length; and two spacer means, one located approximately at either end of said flexible printed circuit board means for bending said flexible printed circuit board means in a curve matching the curved shape of said screen of said displaying means.

4. The apparatus of claim 1 further including:

means for periodically scanning said plurality of infrared light detector means to sense an interruption in one or more of said infrared light beams.

5. The apparatus of claim 1 wherein said flexible printed circuit board means is tapered along its length in the shape of a truncated triangle.

6. The apparatus of claim 1 further including:

a second plurality of infrared light source means disposed in a row along said third side of said screen of said displaying means for emitting a plurality of parallel infrared light beams above said screen of said displaying means;

a second like plurality of infrared light detector means disposed in a row along said fourth side of said screen of said displaying means in spaced apart parallel mating relationship to said plurality of infrared light source means, each of said infrared light detector means for receiving a corresponding one of said parallel infrared light beams; and means for periodically scanning said second plurality of infrared light detector means to sense an interruption in one or more of said infrared light beams.

7. Infrared touch control apparatus for accurately registering the position of a user activated stylus comprising:
- means for displaying a plurality of indicia, wherein said displaying means has a screen that is substantially in the shape of a segment of a cylinder;
- a plurality of infrared light source means disposed in a row along said screen of said displaying means for emitting a plurality of parallel infrared light beams along said screen of said displaying means a predetermined distance above said screen of said displaying means;
- a like plurality of infrared light detector means disposed in a row along said screen of said displaying means in spaced apart parallel mating relationship to said plurality of infrared light source means, each of said infrared light detector means for receiving a corresponding one of said parallel infrared light beams;
- means for periodically scanning said plurality of infrared light detector means to sense an interruption in one or more of said infrared light beams;
- first flexible printed circuit board means connected to said plurality of infrared light source means for positioning said plurality of infrared light source means along said screen of said displaying means a predetermined distance above said screen of said displaying means;
- second flexible printed circuit board means connected to said plurality of infrared light detector means for positioning said plurality of infrared light detector means along said screen of said displaying means a predetermined distance above said screen of said displaying means;
- frame means for securing said first and second flexible printed circuit board means in position in proximate relationship with said screen of said displaying means, including:
- means for securing said flexible printed circuit board midway along its length; and
- two spacer means, one located approximately at either end of said flexible printed circuit board means for bending said flexible printed circuit board means in a curve matching the curved shape of said screen of said displaying means.

8. Infrared touch control apparatus for accurately registering the position of a user activated stylus comprising:
- information display means with a screen that has substantially the curvature of the surface of a cylinder;
- a plurality of infrared light source means aligned in a row that has the curvature of and is juxtaposed with said screen of said information display means to transmit a plurality of parallel infrared light beams across said screen of said information display means a predetermined distance above said screen of said information display means;
- a like plurality of infrared light detector means aligned in a row that has the curvature of and is juxtaposed with said screen of said information display means to receive a corresponding one of said plurality of parallel infrared light beams;
- first flexible printed circuit board means on which is mounted said plurality of infrared light source means, said first flexible printed circuit board means being bent into a curve having the curvature of said screen of said information display means; and
- second flexible printed circuit board means on which is mounted said plurality of infrared detector means, said second flexible printed circuit board means being bent into a curve having the curvature of said screen of said information display means.

9. The apparatus of claim 8 further including:
- means for periodically scanning said plurality of infrared light detector means to sense an interruption in one or more of said infrared light beams.

10. The apparatus of claim 9 further including:
- frame means for securing said first and second flexible printed circuit board means in position in proximate relationship with said curved screen of said information display means, including:
- means for securing said flexible printed circuit board midway along its length; and
- two spacer means, one located approximately at either end of said flexible printed circuit board means for bending said flexible printed circuit board means in a curve matching the curved shape of said screen of said information display means.

11. Infrared touch control apparatus for accurately registering the position of a user activated stylus comprising:
- information display means with a screen that has substantially the curvature of the surface of a cylinder;
- first flexible circuit board means having attached thereto a plurality of infrared light source means aligned in a straight line, wherein said first flexible circuit board means has the curvature of and is juxtaposed with said screen of said information display means to transmit a plurality of parallel infrared light beams across said screen of said information display means a predetermined distance above said screen of said information display means;
- second printed circuit board means having attached thereto a like plurality of infrared light detector means aligned in a straight line, wherein said second flexible circuit board means has the curvature of and is juxtaposed with said screen of said information display means to receive a corresponding one of said plurality of parallel infrared light beams;
- means for securing each of said 1st and 2nd flexible printed circuit board midway along its length; and
- spacer means, one located approximately at either end of each of said 1st and 2nd flexible printed circuit board means for bending said 1st and 2nd flexible printed circuit board means in a curve matching the curved shape of said screen of said information display means.

12. The apparatus of claim 11 further including:
- means for periodically scanning said plurality of infrared light detector means to sense an interruption in one or more of said infrared light beams.

13. Infrared touch control apparatus for accurately registering the position of a user activated stylus comprising:
- information display means for displaying a plurality of indicia, wherein said display means has a screen that is substantially in the shape of a segment of a cylinder, including first and second spaced apart parallel curved sides and third and fourth spaced apart parallel straight sides, such that said first, second, third, fourth sides form a substantially rectangular shaped face;

first flexible circuit board means having attached thereto a plurality of infrared light source means aligned in a straight line;

first shaping means for bending said first flexible circuit board means into the curvature of and juxtaposed with said screen of said information display means to transmit a plurality of parallel infrared light beams across said screen of said information display means a predetermined distance above said screen of said information display means;

second printed circuit board means having attached thereto a like plurality of infrared light detector means aligned in a straight line; and second shaping means for bending said second flexible circuit board means into the curvature of and juxtaposed with said screen of said information display means to receive a corresponding one of said plurality of parallel infrared light beams.

14. The apparatus of claim 13 wherein said first and said second shaping means each include:

means for securing said flexible printed circuit board midway along its length; and two spacer means, one located approximately at either end of said flexible printed circuit board means for bending said flexible printed circuit board means in a curve matching the curved shape of said screen of said information display means.

* * * * *